M. S. GLEASON
April 23, 1929. COIN SAVINGS BANK Re. 17,284
Original Filed Sept. 26, 1924 3 Sheets-Sheet 1
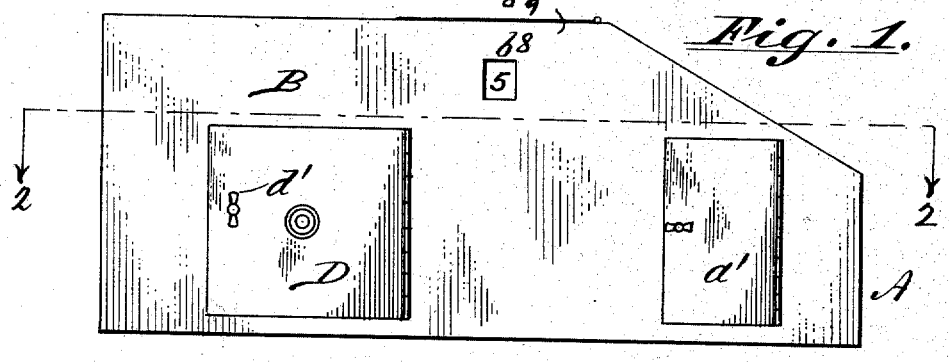
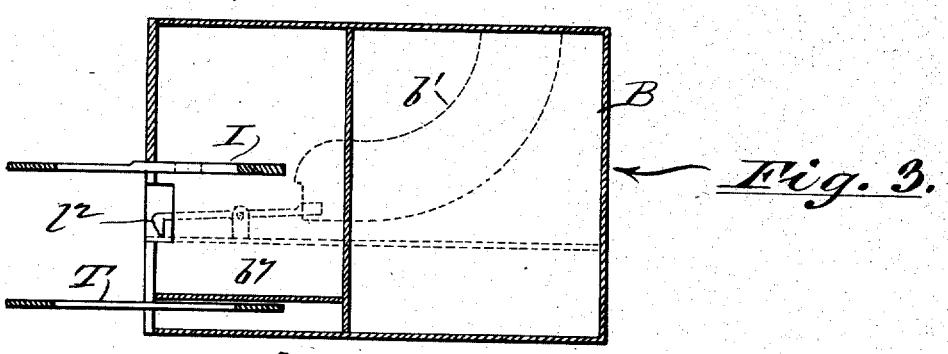
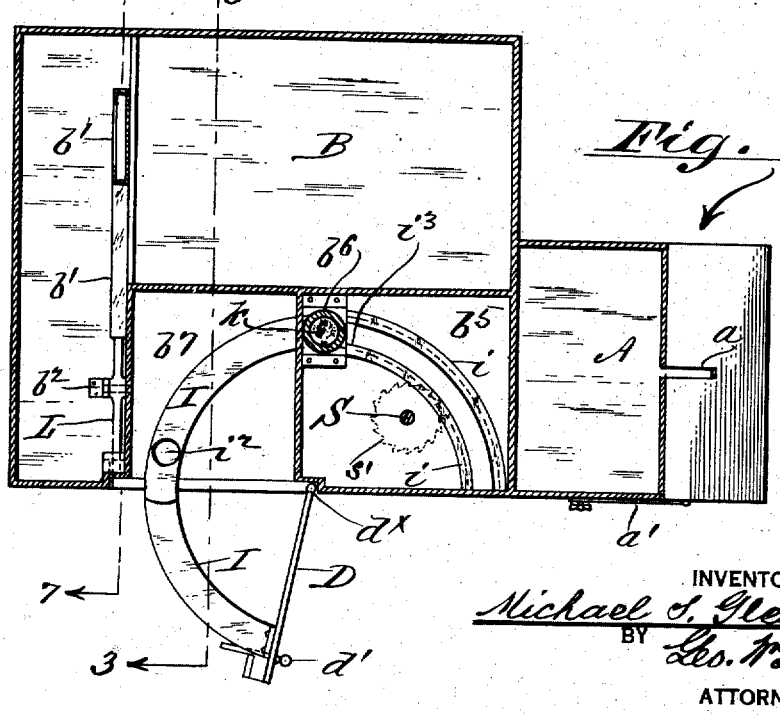
INVENTOR
Michael S. Gleason,
BY Geo. W. Hiatt
ATTORNEY April 23, 1929. M. S. GLEASON Re. 17,284

COIN SAVINGS BANK

Original Filed Sept. 26, 1924 3 Sheets-Sheet 2

INVENTOR
Michael S. Gleason,
BY
Geo. W. McIntyre
ATTORNEY

April 23, 1929. M. S. GLEASON Re. 17,284

COIN SAVINGS BANK

Original Filed Sept. 26, 1924 3 Sheets-Sheet 3

Inventor:
Michael S. Gleason,
By Geo. M. Hiatt
Attorney.

Reissued Apr. 23, 1929. Re. 17,284

UNITED STATES PATENT OFFICE.

MICHAEL S. GLEASON, OF NEW YORK, N. Y.

COIN-SAVINGS BANK.

Original No. 1,601,170, dated September 28, 1926, Serial No. 740,014, filed September 26, 1924. Application for reissue filed April 13, 1928. Serial No. 269,848.

My improvements relate to toy savings banks, so called,—i. e. to devices designed primarily for the use of children, for the reception and storage of coins, temporarily or otherwise; my main object being to provide a device of the character described to cause an interest coin to be automatically delivered, on depositing a coin of prescribed larger denomination; and a supplemental object being to afford a simple but practical operative contrivance of this character for the convenient storage of savings in a primary compartment until a sufficient amount is attained, and then the automatic delivery to the depositor of an interest coin or token of relatively small value when a prescribed coin of larger denomination, representing the equivalent of the primary collection, is deposited in the main compartment of the bank, in which the deposits thus effected are inaccessible until released by the unlocking of a closure provided for the purpose,—the anticipation of the "interest" coin thus provided for being intended to incite curiosity, stimulate attention, and act as an incentive to thrift and economy, at the same time affording amusement and entertainment to all concerned. By my invention, it is contemplated that wherever the term "coin" is used herein, legal tender is meant.

Since the device herein contemplated is a bank, the depositor receives primarily an interest coin on inserting a deposit coin. If, however, other objects be delivered to the depositor, in lieu of an interest coin, which do not, as such, have a pecuniary value to the depositor, as for example, deposit or record slips, the fundamental character of the invention as a bank, and of the nature of the delivery, including the interest coin as a sole return of value to the depositor, is not modified. In the claims hereinafter following, it will be understood that by value is meant pecuniary or monetary value, or anything that may be the equivalent thereof to the depositor.

To this end the invention consists in the specific construction, combination and arrangement of parts and appurtenances described and claimed, whereby these and other desirable results are attained, distinctive features being the simulation, in so far as is possible mechanically, of the conditions incidental to the functions of an ordinary savings bank; the means provided for preventing surreptitious manipulation; the automatic release of the interest coin when the prescribed deposit is made, etc., all as hereinafter fully set forth.

In the accompanying drawings I illustrate more or less diagrammatically a practical embodiment of the essential features of my invention and contrivance as adapted to the production of a practical commercial commodity in the form of a portable coin saving device of the character designated, although I do not limit myself to the identical form and construction of parts and appurtenances herein shown by way of exemplification, since changes in minor details may be made and equivalent mechanical expedients resorted to, with like results, and without departing from the spirit and intent of my invention.

With this understanding:—

Fig. 1 is a front elevation of my portable toy coin saving bank, considered as a unit;

Fig. 2 is a horizontal sectional elevation taken upon plane of line 2—2, Figs. 1 and 5;

Fig. 3 is a vertical sectional elevation taken upon plane of line 3—3, Fig. 2;

A, is what may be defined as an auxiliary or primary compartment of my coin saving institution, considering the latter in a unitary sense; and B, the bank compartment proper, containing the interest-paying contrivance, and in which the savings are stored subject to removal as hereinafter set forth. The primary compartment A, is designed and provided for the temporary holding of loose coins until they aggregate an amount equivalent to the denomination of coin suitable for deposit in the main bank compartment B, when they are exchanged for said deposit coin, which is then inserted in the receiving slot $b$, in the upper part of said compartment B, resulting in the release of an interest coin or token as a receipt for the deposit. Hence the primary saving compartment A, may be of plain structure, simply provided with a coin-receiving slot $a$, and a door $a'$, or similar closure, preferably unlocked so that access may be readily had to the contents of the compartment for inspection, counting, etc.

A deposit coin C, of prescribed size and denomination, inserted through the slot $b$, descends through a curved channel $b'$, and contacts with the short arm $l$, of the latch lever L, fulcrumed at $b^2$, and the long arm $l'$, of which lever L, is formed with the latch shoulder $l^2$, for engagement with a hasp shoulder $d$, affixed to the inner side of the door D, which latter is hinged to the front wall of the main bank compartment B, as indicated more particularly in Figs. 6, 7, 11 and 12, of the drawings.

Figure 12:
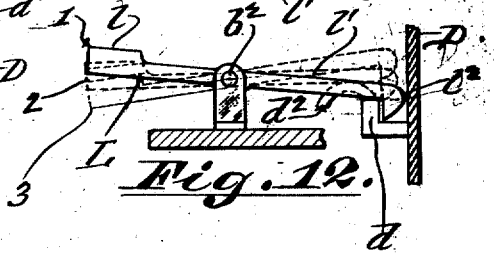
Fig. 12 is a side elevation thereof.
Figure 8:
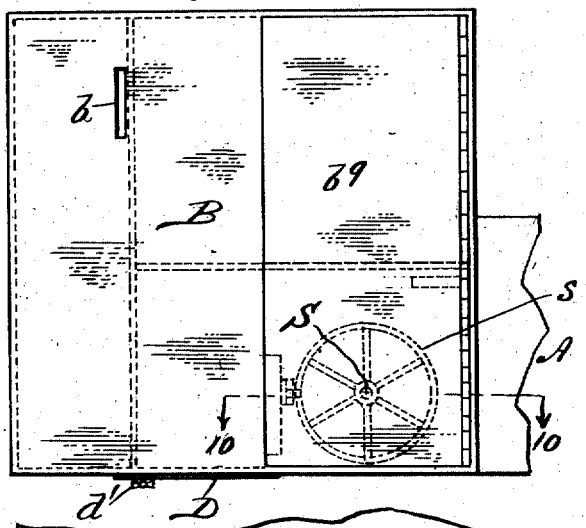
Fig. 8 is a top view of the main compartment of my interest-paying toy bank, illustrating in dotted lines the automatic release of the closure which, when opened, gives access to the reservoir for the interest coins.
Figure 10:
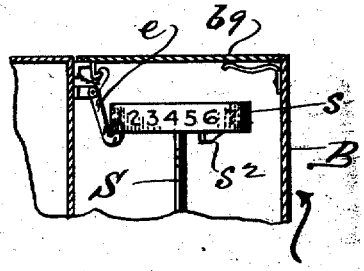
Fig. 10 is a sectional detail taken upon plane of line 10—10, Fig. 8.
Figure 13:
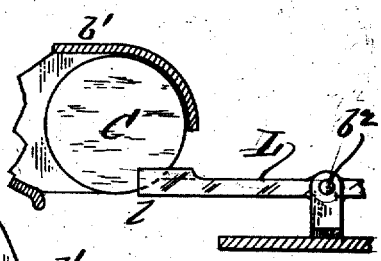
Fig. 13 is a diagram illustrating the action of the deposit coin in tripping the door latch and being held thereby until dropped by the opening of the door.

The preponderance of weight of the long arm $l'$, of the latch lever L, as compared with the short arm $l$, thereof, tends constantly to hold the latch shoulder $l^2$, in contactual engagement with the said hasp shoulder $d$, on the door D, as shown in solid lines (position 1) in Fig. 12. In this normal position the latch lever L is inclined slightly from the horizontal with its inner extremity raised and projecting slightly into the lower portion of the channel $b'$, and within the path of the edge of a deposit coin C, descending therethrough the size and weight of said coin being such that on contacting with said inner end of the latch lever L, it will trip the latter into a substantially horizontal position as indicated by the dotted lines 2 in Fig. 12, thereby raising the latch shoulder $l^2$, above the level of the hasp shoulder $d$, but the preponderance of weight of the long arm $l'$, of the latch lever L, being such that while it permits this preliminary tripping of the lever L, by the coin, it still predominates sufficiently to hold the coin within the lower extremity of the channel $b'$, and against the upper wall thereof and between it and the inner extremity of said short arm $l$, of the trip lever L, as indicated more particularly in Figs. 6 to 13, of the drawings.

Under these conditions, the door D, being unlatched, may be opened by means of its handle $d'$, which act causes the lateral cam surface $d^2$, of the hasp shoulder $d$, (acting on the lateral extension $l^{22}$, of the latch shoulder $l^2$) to positively tilt the latch lever L, still further, and sufficiently to release the deposit coin C, and allow it to drop through the aperture $b^2$, in the horizontal partition $b^3$, and into the lower chamber or subdivision $b^4$, at the bottom of the main bank compartment B, which chamber $b^4$, constitutes the safe for the storage of the deposit coin C.

Figure 4:
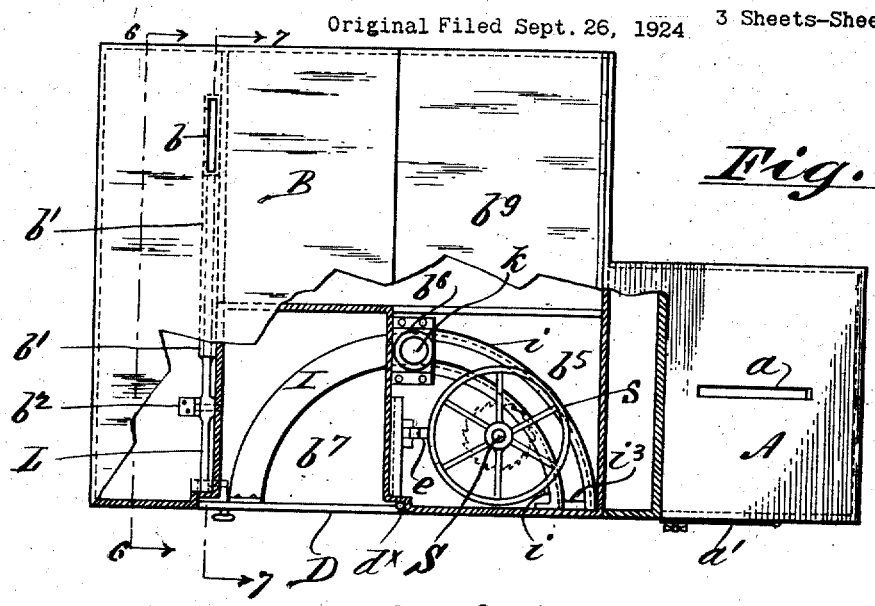
Fig. 4 is a top view of the bank, broken away in part, to show interior mechanism.
Figure 9:
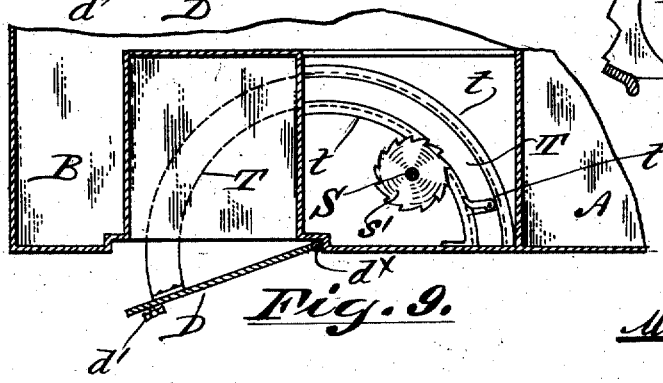
Fig. 9 is a horizontal sectional detail taken upon plane of line 9—9, Fig. 5.

Rigidly attached to and mounted upon the door D, are semi-circular tractor plates I, T, concentric with the hinge $d^x$, of the said door D, as will be seen by reference more particularly to Figs. 2, 4 and 9, of the drawings. The inner extremity of the tractor plate I, which for convenience may be designated as the interest delivery plate, is supported between fixed guide-ways $i$, $i$, and in like manner the rear portion of the tractor plates T, which may be designated as the tally plate, is supported between fixed guide-ways or flanges $t$, $t$,—so that each of the said tractor plates I, T, while controlled and actuated through the medium of the door D, is independently and slidably supported in proper alignment.

Figure 5:
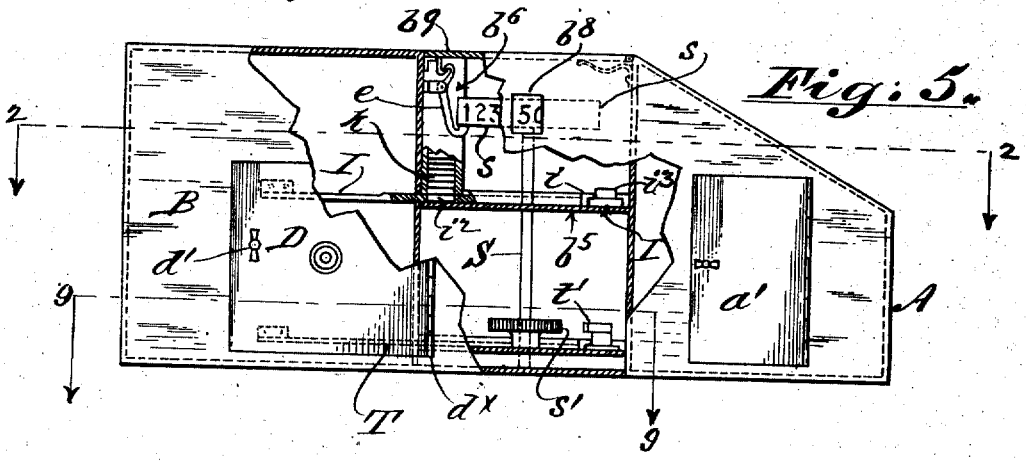
Fig. 5 is a front elevation, broken away in part for a like reason.
Figure 6:
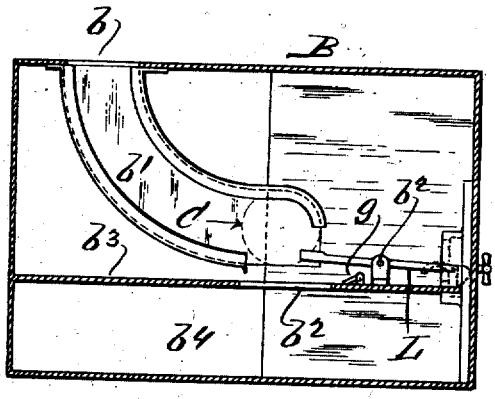
Fig. 6 is a vertical sectional elevation taken upon plane of line 6—6, Fig. 4.
Figure 7:
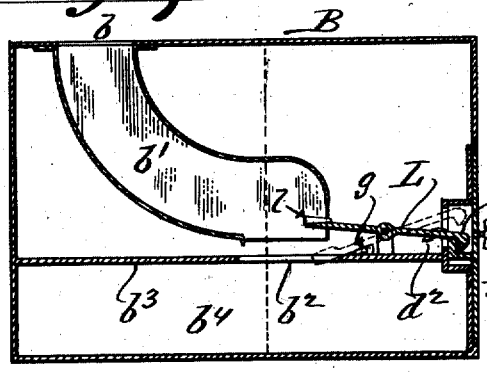
Fig. 7 is a vertical section taken upon plane of line 7—7, Fig. 4.
Figure 11:
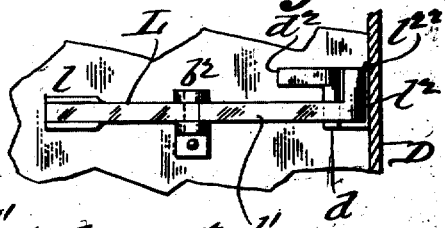
Fig. 11 is a top view of the coin-actuated latch.

The rear portion of the tractor or interest delivery plate I, when retracted by the closure of the door D, rests on the horizontal partition $b^5$, of the main compartment B, which partition $b^5$, also supports the stationary interest column tube $b^6$, in which coins or tokens $k$, of relatively small size and value as compared with the deposit coin C, are stored until delivered in succession by the opening of the door D, to effect the release of a deposit coin C, from the lower end of the receiving channel $b'$, as hereinbefore set forth. The delivery of the interest coin $k$, is attained by means of the walls of an opening $i^2$, extending through the tractor plate I, (see Figures 2 and 5) which coin pocket or opening $i^2$, when the door D, is closed, coincides with the interior walls of the interest column tube $b^6$, the column of interest coins $k$, resting normally on the horizontal floor or partition $b^5$, as indicated more particularly in Fig. 5, of the drawings. Hence, obviously, when the door D, is opened, drawing the tractor plate I, outward, the lowest coin $k$, of the column in the container tube $b^6$, will be withdrawn therefrom and deposited in the delivery section $b^7$, of the main bank compartment B, and will be accessible for removal therefrom when the door D, thereof is opened,—the extent of movement of said door D, being limited in this respect by a stop $i^3$, on the inner end of the tractor plate I, contacting with a stationary part, as for instance, the base of the column tube $b^6$, as indicated in Fig. 2, or by any equivalent mechanical expedient for limiting the advance thrust of said tractor plate I.

During the outward movement of the tractor plate I, above set forth the column of interest coins $k$, in the holder $b^6$, rests upon the top of said tractor plate I, and when said plate is returned to its normal position by the closing of the door D, the lower coin in the column descends automatically into the opening or pocket $i^3$, ready for delivery on the reopening of the door.

The function of the tractor or tally plate T, is to operate the indicator mechanism consisting of the vertical shaft S, on the upper portion of which is rigidly mounted the wheel $s$, on the peripheral cylindrical surface of which are figures (visible successively through the window or sight $b^8$, in the front wall of the compartment B) indicating the number of interest coins $k$, that have been abstracted from the reservoir tube $b^6$,—and the amount deposited in the compartment $b^4$, said shaft S, having rigidly mounted on its lower portion a ratchet wheel $s'$, for engagement with the spring pawl $t'$, mounted on the inner end of the plate T, and by which said shaft S, is actuated intermittingly, or in other words, rotatively advanced a prescribed degree each time the door D, is opened as and for the purpose hereinbefore set forth.

A cam $s^2$, on the indicator wheel $s$ at the completion of each rotation of the latter, actuates a spring latch $e$, to release a door $b^9$, on the top of the compartment B, thereby giving access to the interest coin tube $b^6$, for the purpose of replenishing the supply of said coins $k$, and also affording means for the removal of the deposite coin C, when desirable.

My "interest-paying" bank is designed to convey to youth the fundamental idea of the earning power of money through the means of mechanism which actually delivers to the child the coin representing the financial returns on his savings under an arrangement approximating that of commercial banks wherein there may be "checking accounts" that may be freely drawn upon, and "savings accounts" that can be drawn upon only periodically but which, as a recompense, pay interest.

The full educational value of the "interest-paying" bank is obtained by the payment of interest only upon a voluntary accumulation of the requisite amount. The transition from the toy bank idea to the commercial bank idea is thus made easy.

A further advantage of this provision for both "checking" and "interest-paying" accounts, is that it satisfies the child's demand for "play" by embodying the essential elements of a "game", the effects of which are heightened by the mechanical registration of the amount of the savings, by the delivery of the interest coin in a depository simulating a bank lobby and by its delivery with a "rattle and a bang" upon the operation of a mechanical device (the opening of the door) by the child.

Normally, my coin saving bank is supported in a horizontal position, or substantially so. In order to prevent unintentional unlatching of the door D, by the tilting or reversal of the bank, I provide a gravity latch $g$, so located with relation to the latch lever L, that in case of upsetting or inverting of the bank accidentally or otherwise said latch $g$, will automatically turn into contactual engagement with said latch lever L, and thereby positively secure the door D, in closed position. When the bank reassumes its normal position said latch $g$, is automatically retracted by gravity from engagement with the latch lever L, assuming the normal position in Figs. 6 and 7, of the drawings.

I claim:

1. A toy savings bank of the character designated, comprising, in combination, a deposit receiving channel, a latch lever adapted to be actuated by a coin deposited in said receiving channel, a door held normally closed by said latch lever, a tractor plate attached to said door and formed with an interest coin pocket, an interest coin holder, said pocket registering with the interest coin holder, and means for automatically indicating the number of interest coins delivered operated by said door, substantially in the manner and for the purpose set forth.

2. A toy savings bank of the character designated, comprising, in combination, a deposit receiving channel, a latch lever adapted to be actuated by a coin deposited in said receiving channel, a door held normally closed by said latch lever, a tractor plate attached to said door and formed with an interest coin pocket, an interest coin holder, said pocket registering with the interest coin holder, and means for automatically indicating the number of interest coins delivered, consisting of a tractor plate attached to said door and provided with a spring pawl, a ratchet wheel actuated by said spring pawl, a shaft in which said ratchet wheel is rigidly mounted, and an indicator wheel also rigidly mounted on said shaft, substantially in the manner and for the purpose set forth.

3. A toy savings bank of the character designated, comprising, in combination, a deposit receiving channel, a latch lever adapted to be actuated by a coin deposit in said receiving channel, a door held normally closed by said latch lever, a tractor plate attached to said door and formed with an interest coin pocket, an interest coin holder, said pocket registering with the interest coin holder, and means for automatically indicating the number of interest coins delivered, consisting of a tractor plate attached to said door and provided with a spring pawl, a shaft in which said ratchet wheel is rigidly mounted, and an indicator wheel also rigidly mounted on said shaft, together with a spring latch and door controlled by said indicator mechanism, substantially in the manner and for the purpose set forth.

4. In a toy savings bank, a compartment, a door therefor, semi-circular tractor plates on said door concentric with the hinge thereof, guides for said tractor plates, said plates being slidable, a partition against which one of said plates rests when retracted, an interest column tube supported by said partition, and means for limiting the extent of movement of said plates, a coin operated detent for locking the door, one of said plates being provided with an aperture to receive and deliver an interest coin, and registering means actuated by the opening of said door.

5. A toy bank comprising an enclosure, a door for said enclosure, a coin slot in said enclosure adapted to receive a coin of a relatively large diameter, a latch member, a member adapted to cooperate therewith and so arranged that a coin of substantially the maximum diameter admissible through said coin slot when held edgewise between said latch member and said cooperating member will hold said latch member in open position but a coin of substantially smaller diameter will not hold said latch member open, an interest holder adapted to hold coins but only of smaller diameter than will operate said latch member, means whereby one such smaller coin may be withdrawn when said latch member is in open position, a lock for the door to said enclosure, a rotatable member adapted to open said lock, and means positively operated as an incident to withdrawing the smaller coin, whereby the larger coin is caused to move out of contact with said latch member and said rotatable member is rotated a part of one turn.

In testimony whereof I affix my signature.

MICHAEL S. GLEASON.